United States Patent
Asai

(10) Patent No.: US 10,455,105 B2
(45) Date of Patent: Oct. 22, 2019

(54) NON-TRANSITORY COMPUTER-READABLE MEDIUM HAVING INSTRUCTIONS, INFORMATION PROCESSING DEVICE, AND CONTROL METHOD

(71) Applicant: BROTHER KOGYO KABUSHIKI KAISHA, Nagoya-shi, Aichi-ken (JP)

(72) Inventor: Norihiko Asai, Tajimi (JP)

(73) Assignee: BROTHER KOGYO KABUSHIKI KAISHA, Nagoya-Shi, Aichi-Ken (JP)

(*) Notice: Subject to any disclaimer, the term of this patent is extended or adjusted under 35 U.S.C. 154(b) by 0 days.

(21) Appl. No.: 16/142,301

(22) Filed: Sep. 26, 2018

(65) Prior Publication Data
US 2019/0104230 A1  Apr. 4, 2019

(30) Foreign Application Priority Data
Sep. 29, 2017 (JP) .................... 2017-189651

(51) Int. Cl.
| G06F 3/12 | (2006.01) |
| H04N 1/00 | (2006.01) |
| H04L 29/08 | (2006.01) |

(52) U.S. Cl.
CPC ......... *H04N 1/00973* (2013.01); *H04L 67/34* (2013.01); *H04N 1/0048* (2013.01); *H04N 1/00244* (2013.01); *H04N 1/00307* (2013.01); *H04N 1/00474* (2013.01); *H04N 2201/0094* (2013.01)

(58) Field of Classification Search
CPC .......... H04N 1/00973; H04N 1/00244; H04N 1/00307; H04N 1/00474; H04N 1/0048; H04N 2201/0094; H04L 67/34
See application file for complete search history.

(56) References Cited

U.S. PATENT DOCUMENTS

| 9,430,723 B1* | 8/2016 | Panda ................. G06F 3/12 |
| 2003/0123082 A1* | 7/2003 | Hall ................. G06F 3/1204 358/1.15 |
| 2013/0016375 A1* | 1/2013 | Hashidume .......... G06F 3/1222 358/1.9 |
| 2015/0248263 A1* | 9/2015 | Hattori ............... G06F 3/1204 358/1.15 |
| 2017/0026534 A1 | 1/2017 | Kinoshita |

FOREIGN PATENT DOCUMENTS

| JP | 2017-027467 A | 2/2017 |
| JP | 2017-117293 A | 6/2017 |

* cited by examiner

*Primary Examiner* — Moustapha Diaby
(74) *Attorney, Agent, or Firm* — Scully, Scott, Murphy & Presser, P.C.

(57) ABSTRACT

A non-transitory computer-readable medium has instructions to control a computer, which includes a communication interface capable of communicating with an image processing device, to perform operations, and the operations includes: causing to select an arbitrary image processing device from one or more image processing devices, and notifying a specific function, the specific function being possible to be executed by updating a version of firmware of a selection image processing device that is selected in the selecting.

11 Claims, 10 Drawing Sheets

NON-TRANSITORY COMPUTER-READABLE MEDIUM HAVING INSTRUCTIONS, INFORMATION PROCESSING DEVICE, AND CONTROL METHOD

CROSS-REFERENCE TO RELATED APPLICATION

This application claims priority from Japanese Patent Application No. 2017-189651 filed on Sep. 29, 2017, the entire subject matter of which is incorporated herein by reference.

TECHNICAL FIELD

This disclosure relates to a non-transitory computer-readable medium having instructions which is readable by a computer of an information processing device which can communicate with an image processing device.

BACKGROUND ART

In a background art, when an arbitrary image processing device is selected as a device to execute image processing, the information processing device which can communicate with an image processing device acquires information on performances of the device from the selected image processing device, that is, a selection device. An icon to execute various types of processes in the selection device based on the acquired information is displayed on a display interface of the information processing device.

SUMMARY

A specific function may be not executed if a version of firmware of the selection device selected in the information processing device is not upgraded. In such a case, if the selection device is selected before the version is upgraded, an icon to execute the specific function is not displayed. Therefore, a user may fail to notice that the selection device is a device which is possible to execute the specific function by the upgrading of the version of the firmware. This disclosure is to notify a specific function to a user in a case where the selection device has the specific function which is possible to be executed by the upgrading of the version of the firmware.

A non-transitory computer-readable medium of this disclosure has instructions to control a computer, which includes a communication interface capable of communicating with an image processing device, to perform operations, and the operations includes: causing to select an arbitrary image processing device from one or more image processing devices, and notifying a specific function, the specific function being possible to be executed by updating a version of firmware of a selection image processing device that is selected in the selecting.

An information processing device of this disclosure includes: a communication interface which is capable of communicating with an image processing device; and a controller, wherein the controller is caused to execute a notification process in which a specific function is notified, the specific function being possible to be executed by updating a version of firmware of a selection image processing device which is a selected image processing device after an arbitrary image processing device is selected from one or more the image processing devices.

A control method of this disclosure is executed by a computer of an information processing device which includes a communication interface capable of communicating with an image processing device, the method includes: causing to select an arbitrary image processing device from one or more image processing devices, and notifying a specific function, the specific function being possible to be executed by updating a version of firmware of a selection image processing device that is selected in the selecting.

According to this disclosure, a specific function which is possible to be used by updating a version of firmware of a selection device is notified. According to this configuration, it is possible to notify the specific function to a user in a case where the selection device has the specific function which is possible to be executed by the upgrading of the version of the firmware.

BRIEF DESCRIPTION OF THE DRAWINGS

The foregoing and additional features and characteristics of this disclosure will become more apparent from the following detailed descriptions considered with the reference to the accompanying drawings, wherein.

DETAILED DESCRIPTION

Configuration of Communication System

Figure 1:
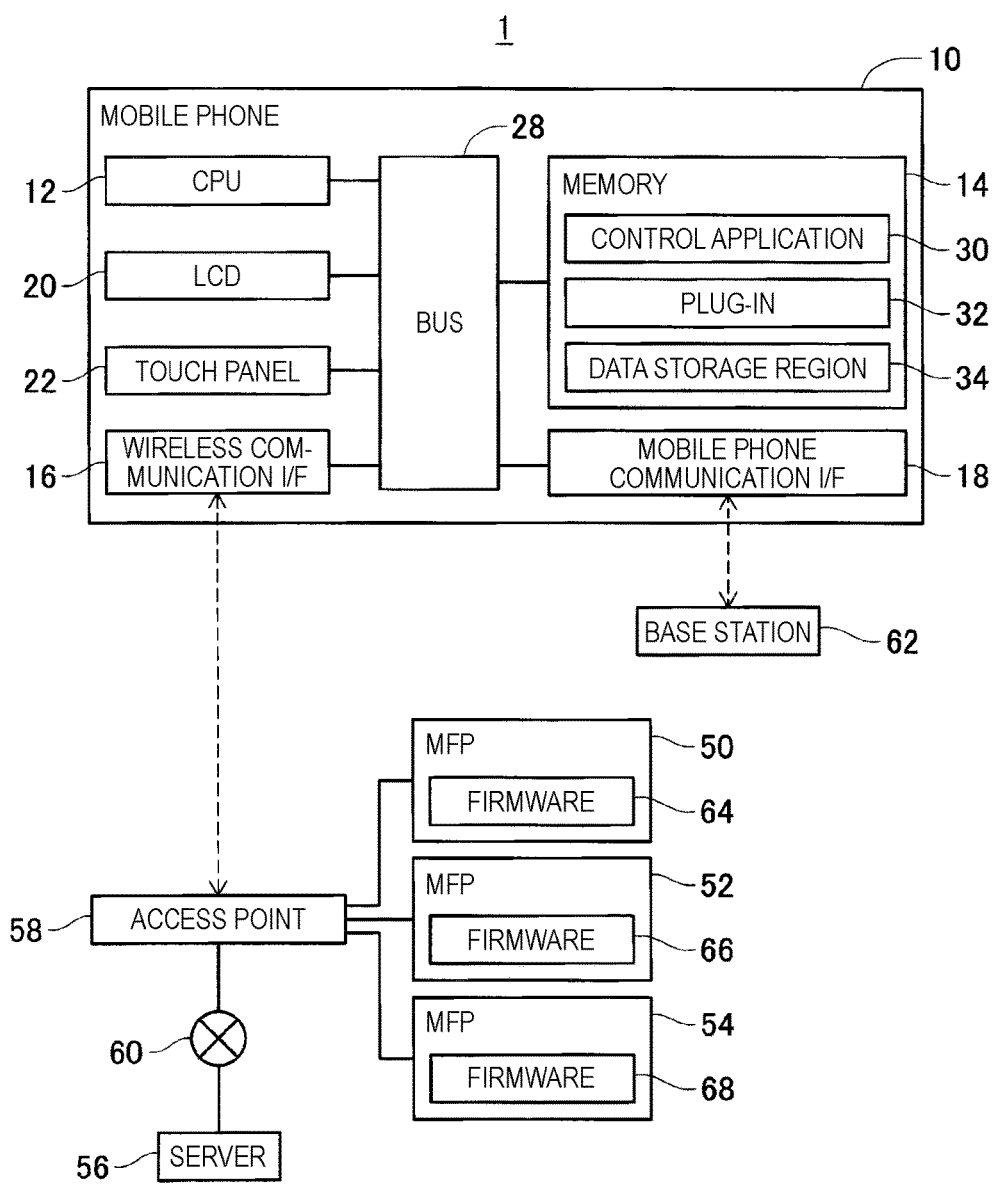
FIG. 1 is a block diagram of a communication system.

FIG. 1 illustrates a block diagram of a communication system 1 according to an embodiment of the present application. The communication system 1 includes a mobile phone (an example of an information processing device of this disclosure) 10, MFPs (abbreviation for Multifunction Peripherals; an example of an image processing device of this disclosure) 50, 52, and 54, a server 56, an access point 58, the Internet 60, and a base station 62. The MFPs 50, 52, and 54 are devices which have firmware 64, 66, and 68 respectively and is capable of executing various types of processes such as a copy process and a scan process according to the operation of the firmware 64, 66, and 68. The server 56 is a server which stores latest versions of firmware of the MFPs 50, 52, and 54, and provides the firmware. The access point 58 has functions of a wireless LAN access point and a router. The server 56 is connected to the Internet 60, and is capable of communicating with an external device through the access point 58.

A configuration of the mobile phone 10 will be described. The mobile phone 10 mainly includes a CPU (abbreviation for Central Processing Unit; an example of a computer of this disclosure) 12, a memory 14, a wireless communication I/F (an example of a communication interface of this disclosure) 16, a mobile phone communication I/F 18, an LCD (abbreviation for liquid crystal display; an example of a display interface of this disclosure) 20, and a touch panel 22. These components are configured to communicate with each other through a bus 28.

The wireless communication I/F 16 is configured to perform a wireless communication with a Wi-Fi® (registered trademark of Wi-Fi Alliance) protocol (this may be referred to as WF protocol) on the basis a standard of IEEE 802.11 and a standard equivalent thereto. In other words, the mobile phone 10 accesses the access point 58. In a state where the wireless communication with the WF protocol can be made, the mobile phone 10 may perform data communication with the MFPs 50, 52, and 54 and the server 56 through the access point 58.

The mobile phone communication I/F 18 is configured to perform the wireless communication of a mobile phone communication system with respect to the base station 62. In other words, the mobile phone 10 is configured to perform data communication through the base station 62 in a state where the wireless communication of the mobile phone communication system is made.

The CPU 12 executes a process according to a control application (an example of a control program of this disclosure) 30 in the memory 14 or a plug-in (an example of a program of this disclosure) 32. The control application 30 is a program for executing various types of processes on the MFPs 50, 52, and 54 using the mobile phone 10. The plug-in 32 is a program through which a new function can be added to the control application 30. Specifically, the plug-in 32 is a program for creating image data for label printing, and executing a label print process on the MFPs 50, 52, and 54 by the operation of the control application 30. The CPU 12 executing the control application 30 may be denoted simply by a program name. For example, the expression "the control application 30" may mean "the CPU 12 which executes the control application 30".

The memory 14 includes a data storage region 34. The data storage region 34 is a region to store data necessary for executing the control application 30. The memory 14 is configured by combining a RAM (abbreviation for Random Access Memory), a ROM (abbreviation for Read Only Memory), a flash memory, an HDD (abbreviation for Hard Disk Drive), and a buffer of the CPU 12. The LCD 20 includes a display surface where various types of functions of the mobile phone 10 are displayed. The touch panel 22 includes a touch sensor, and is disposed to cover the display surface of the LCD 20. The touch panel 22 detects approaching or contacting of a user's finger or a touch pen to the touch panel 22, and outputs an electric signal according to the detection.

Operation of Communication System

In the communication system 1, the plug-in 32 in the mobile phone 10 creates the image data for label printing, and the control application 30 transmits the image data for label printing to the MFP 50, so that the label print process is executed in the MFP 50. However, it is not that all the MFPs 50, 52, and 54 capable of communicating to the mobile phone 10 are configured to execute the label print process.

Specifically, while the MFP 50 is possible to execute the label print process, the MFP 52 is not possible to execute the label print process. The MFP 54 has a structure to execute the label print process. However, if the version of the firmware 68 of the MFP 54 is not updated to a version equal to or higher than a predetermined version, the MFP 54 is not possible to execute the label print process. In other words, the MFP 54 is possible to execute the label print process in a case where the version of the firmware 68 is updated to a version equal to or higher than a predetermined version.

Therefore, in the communication system of the background art, in a case where it is acknowledged that the label printing process is not possible to be executed if the version of the firmware 68 of the MFP 54 is not updated after the MFP 54 is selected as a device to execute the label print process, the version of the firmware 68 of the MFP 54 is updated first, and then the MFP 54 is needed to be selected again. On the other hand, even in a case where it is acknowledged that the label print process is not possible to be executed if the version of the firmware 68 of the MFP 54 is not updated after the MFP 54 is selected as a device to execute the label print process in the communication system 1, the label print process can be executed without selecting the MFP 54 again.

In the following, the operation of the communication system 1 at the time of executing the label print process will be described. First, in order to execute the label print process, there is a need to install the plug-in 32 creating the image data for label printing in the mobile phone 10. In other words, the control application 30 is a program to execute various types of processes in the MFPs 50, 52, and 54. However, if the plug-in 32 is not installed in the mobile phone 10, the label print process is not possible to be executed in the MFPs 50, 52, and 54. Only processes other than the label print process, for example, a normal print process and a scan process are executed in the MFPs 50, 52, and 54.

Figure 2:
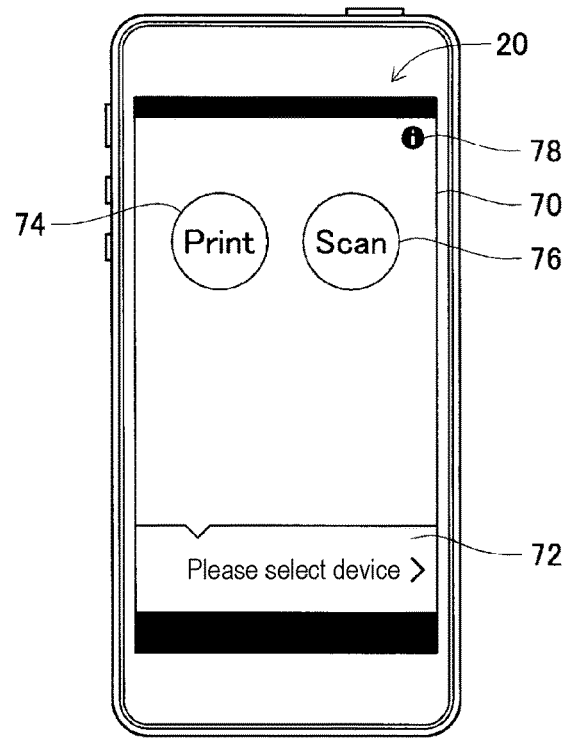
FIG. 2 is a diagram illustrating a top screen.

Therefore, when the control application 30 is activated in a state where the plug-in 32 is not installed in the mobile phone 10, a top screen 70 illustrated in FIG. 2 is displayed on the LCD 20. In the top screen 70, a device select button 72 is displayed. When the device select button 72 is operated, a device to execute various types of processes is selected. When a device is selected, the selected device is displayed instead of the device select button 72. In other words, FIG. 2 illustrates the top screen 70 in a state where a device is not selected.

In the top screen 70 in a state where a device is not selected, a process operation button capable of being executed by the control application 30 is displayed. As described above, the control application 30 is not possible to execute the label print process in the MFPs 50, 52, and 54 if the plug-in 32 is not installed in the mobile phone 10. However, the control application 30 is only possible to execute a normal print process and a normal scan process in the MFPs 50, 52, and 54. Therefore, a print button 74 and a scan button 76 are displayed on the top screen 70 illustrated in FIG. 2. When any one of the print button 74 and the scan button 76 is operated, a process (that is, any one of a normal print process and a normal scan process) corresponding to the operated button is executed. In this way, the label print process is not possible to be performed in a state where the plug-in 32 is not installed in the mobile phone 10.

Then, a user operates an information button 78 on the top screen 70 in order to install the plug-in 32 in the mobile phone 10. Therefore, the control application 30 displays an information screen 80 illustrated in FIG. 3 on the LCD 20 instead of the top screen 70. In the information screen 80, an install button (an example of a second operation button and an icon of this disclosure) 82 is displayed. When the install button 82 is operated, the plug-in 32 is installed in the mobile phone 10. When the plug-in 32 is installed in the mobile phone 10, the install button 82 is not displayed on the information screen 80.

Figure 4:
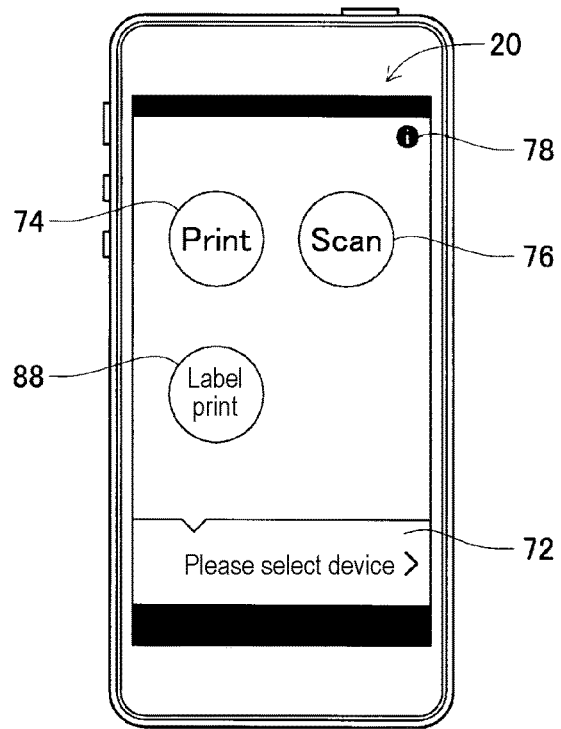
FIG. 4 is a diagram illustrating the top screen.

When the top screen 70 is displayed on the LCD 20 after the plug-in 32 is installed in the mobile phone 10, in addition to the print button 74 and the scan button 76 in the top screen 70 as illustrated in FIG. 4, a label print button (an example of a first operation button and the icon of this disclosure) 88 is displayed. According to this configuration, the label print process can be executed in the MFP 50 by a user's operation onto the top screen 70.

However, the devices which can communicate with the mobile phone 10, that is, ny of the MFPs 50, 52, and 54 are not possible to execute the label print process. Therefore, the control application 30 displays the label print button 88 on the top screen 70 only in a case where the device selected as a target to execute various types of processes is possible to execute the label print process.

Figure 5:
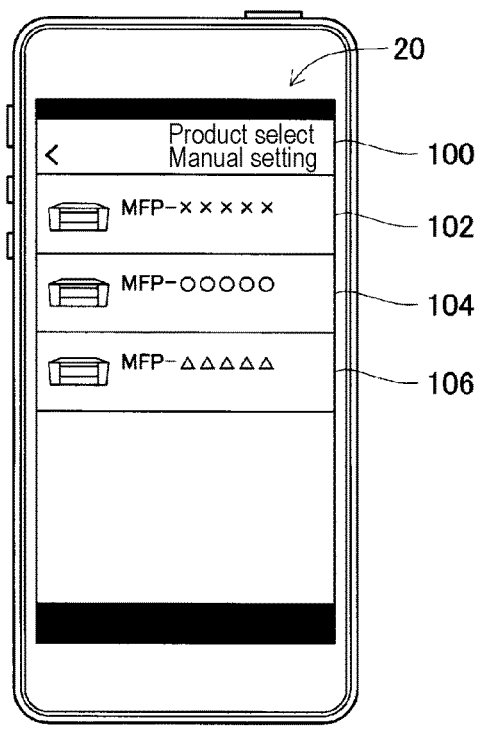
FIG. 5 is a diagram illustrating a device select screen.

Specifically, when the user operates the device select button 72 in the top screen 70, a device select screen 100 illustrated in FIG. 5 is displayed on the LCD 20. The device select screen 100 is a screen which is used to search devices which can communicate with the mobile phone 10 and to select an arbitrary device from the searched devices. Therefore, in the device select screen 100, a first select button 102 which is used to select the MFP 50, a second select button 104 which is used to select the MFP 52, and a third select button 106 which is used to select the MFP 54 are displayed. At the time of searching a device, information (hereinafter, referred to as "current version information") of a version of the firmware used in the device from the searched device is acquired.

In the device select screen 100, when any one of the first to third select buttons 102, 104, and 106 is operated, a device corresponding to the operated button is determined as a target device to execute various types of processes (hereinafter, referred to as "selection device"). At this time, it is determined whether the selection device is a device which is possible to execute the label print process. Specifically, corresponding model information is stored in the data storage region 34 of the mobile phone 10. The corresponding model information is model information indicating whether the device can execute the label print process. The corresponding model information is output from the plug-in 32 installed in the mobile phone 10 to the control application 30, and stored in the data storage region 34.

The corresponding model information includes a white list, a black list, and a gray list. The white list is configured by the model information of the MFP 50 which is possible to execute the label print process. The black list is configured by the model information of the MFP 52 which is not possible to execute the label print process. The gray list is configured by the model information of the MFP 54 which is possible to execute the label print process by the upgrading of the version of the firmware.

When the selection device is selected, the control application 30 determines which list among the white list, the black list, and the gray list includes the model information of the selection device. At this time, in a case where the MFP 50 is selected as the selection device, the MFP 50 is a device which is possible to execute the label print process as described above. In other words, the model information of the MFP 50 selected as the selection device is included in the white list. The control application 30 determines that the model information of the selection device is included in the white list.

Figure 6:
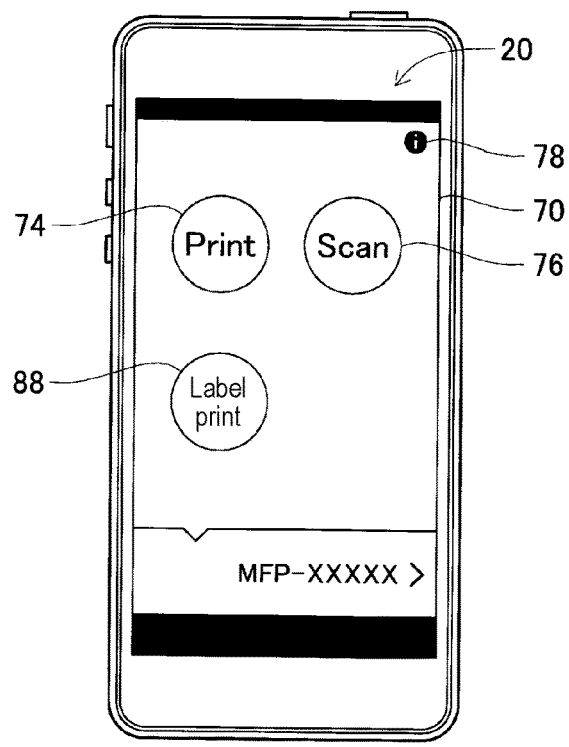
FIG. 6 is a diagram illustrating the top screen.

According to this configuration, the control application 30 determines that the MFP 50 selected as the selection device is a device which is possible to execute the label print process. As illustrated in FIG. 6, the label print button 88 is displayed on the top screen 70 together with the print button 74 and the scan button 76. In a case where the MFP 50 is selected as the selection device, the model information of the MFP 50 is displayed on the top screen 70 instead of the device select button 72. When the label print button 88 is operated, the plug-in 32 is activated. According to this configuration, the image data for label printing is created by the operation of the plug-in 32. The image data is transmitted to the MFP 50, and thus the label print process is executed in the MFP 50.

In a case where the MFP 52 is selected as a selection device when it is determined which list among the white list, the black list, and the gray list includes the model information of the selection device, the MFP 52 is a device which is not possible to execute the label print process as described above. In other words, the model information of the MFP 52 selected as a selection device is included in the black list, and the control application 30 determines that the model information of the selection device is included in the black list.

Figure 7:
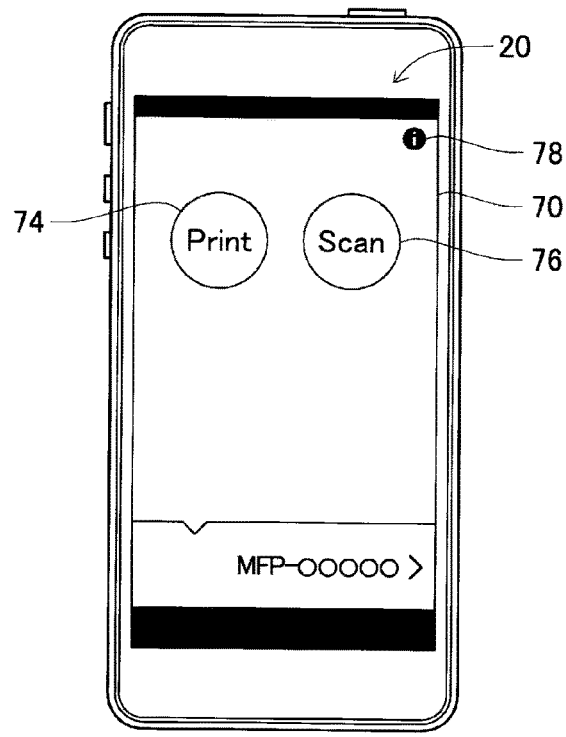
FIG. 7 is a diagram illustrating the top screen.

According to this configuration, the control application 30 determines that the MFP 52 selected as a selection device is a device which is not possible to execute the label print process. As illustrated in FIG. 7, the print button 74 and the scan button 76 are displayed without displaying the label print button 88 on the top screen 70. In a case where the MFP 52 is selected as a selection device, the model information of the MFP 52 is displayed on the top screen 70 instead of the device select button 72. According to this configuration, in a case where the MFP 52 which is not possible to execute the label print process is selected as a selection device, it is possible to prevent that the user makes an operation to execute the label print process.

In a case where the MFP 54 is selected as a selection device when it is determined which list the model information of the selection device is included in among the white list, the black list, and the gray list, the MFP 54 is a device which is possible to execute the label print process after version upgrading as described above. In other words, the model information of the MFP 54 selected as a selection device is included in the gray list, and the control application 30 determines that the model information of the selection device is included in the gray list.

Then, it is determined whether, if the version of the firmware 68 of the selection device (that is, the MFP 54) is updated, the MFP 54 is possible to execute the label print process. Specifically, the control application 30 accesses the server 56 when it is determined that the model information of the selection device is included in the gray list. Since the server 56 stores the latest versions of the firmware of the MFPs 50, 52, and 54 as described above, the control application 30 acquires information (hereinafter, referred to as "the latest version information") on the latest version of the firmware 68 of the selection device (that is, the MFP 54) from the server 56. The control application 30 compares the version (hereinafter, referred to as "the latest version") of the latest version information acquired from the server 56 with the version (hereinafter, referred to as "current version") of the current information of the selection device acquired before.

At this time, in a case where the current version becomes the latest version, the firmware 68 has upgraded to the latest version in the selection device (that is, the MFP 54), and the MFP 54 is possible to execute the label print process. Therefore, the control application 30 determines that the MFP 54 selected as a selection device becomes a device which is possible to execute the label print process by the upgrading the version of the firmware 68. The label print button 88 is displayed on the top screen 70 together with the print button 74 and the scan button 76. According to this configuration, the label print process is executed in the MFP 54 by operating the label print button 88.

On the other hand, in a case where the current version is not the latest version when the control application 30 compares the latest version with the current version, the firmware 68 in the MFP 54 is not upgraded to the latest version. The MFP 54 is not possible to execute the label print process. Then, in a case where the current version is not the latest version, the control application 30 updates the firmware 68 of the MFP 54 to the latest version.

Specifically, the control application 30 transmits a command for updating the version to the MFP 54. The MFP 54 stores information which is used to access the server 56. Then, the MFP 54 accesses the server 56 using the information, and upgrades the version of the firmware 68. According to this configuration, the version of the firmware 68 of the MFP 54 becomes the latest version.

Subsequently, the control application 30 inquires of the MFP 54 about whether the label print process is possible to be executed. Specifically, the control application 30 transmits a command to transmit information (hereinafter, referred to as "execution propriety information") indicating whether the label print process is possible to execute toward the mobile phone 10 to the MFP 54. The MFP 54 determines whether the label print process is possible to be executed in the current version of firmware. Therefore, when receiving the transmission command of the execution propriety information from the mobile phone 10, the MFP 54 returns a result of determining whether the label print process is possible to be executed in the current version of firmware as the execution propriety information to the mobile phone 10.

At this time, since the firmware 68 is updated in the MFP 54 as described above, the MFP 54 transmits the execution propriety information indicating that the label print process is possible to be executed toward the mobile phone 10. Therefore, the control application 30 determines that the MFP 54 selected as a selection device becomes a device which is possible to execute the label print process by the version of the upgrading of the firmware 68. The label print button 88 is displayed on the top screen 70 together with the print button 74 and the scan button 76. According to this configuration, the label print process is executed in the MFP 54 by operating the label print button 88.

Figure 8:
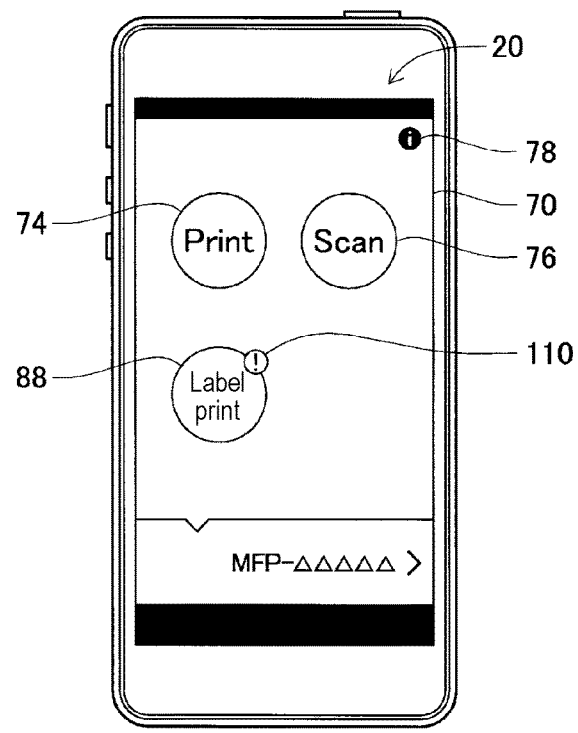
FIG. 8 is a diagram illustrating the top screen.

However, the firmware 68 may be not appropriately updated due to a network failure. In such a case, the firmware 68 of the MFP 54 is not upgraded to the latest version. Therefore, the MFP 54 transmits the execution propriety information indicating that the label print process is not possible to be executed toward the mobile phone 10. When the control application 30 receives the execution propriety information indicating that the label print process is not possible to be executed from the MFP 54, the top screen 70 illustrating FIG. 8 is displayed on the LCD 20.

In the top screen 70, the label print button 88 is displayed together with the print button 74 and the scan button 76. However, the label print button 88 is displayed in a state where a mark (an example of a first specific symbol of this disclosure) 110 is added. The mark 110 indicates that a process corresponding to the button is not executed even if the button to which the mark 110 is added is operated. Therefore, even if the user operates the label print button 88 added with the mark 110, the process corresponding to the label print button 88 (that is, the label print process) is not executed. On the contrary, when the label print button 88 added with the mark 110 is operated, a process different from the process corresponding to the label print button 88 is executed.

Specifically, when the label print button 88 added with the mark 110 is operated, the control application 30 updates the firmware 68 of the MFP 54 to the latest version. In other words, the control application 30 transmits a command for updating the version to the MFP 54, and causes the MFP 54 to update the version of the firmware 68 again. According to this configuration, in a case where the version of the firmware 68 of the MFP 54 is not possible to be upgraded due to a network failure, the upgrading of the version of the firmware 68 is executed again.

After transmitting the update command to the MFP 54, the control application 30 inquires of the MFP 54 again about whether the label print process is possible to be executed. At this time, when receiving the execution propriety information indicating that the label print process is not possible to be executed from the MFP 54, the control application 30 displays again the label print button 88 added with the mark 110 on the top screen 70. When the label print button 88 is operated, the control application 30 updates the firmware 68 of the MFP 54 to the latest version. In other words, the displaying of the label print button 88 added with the mark 110, the command for updating the firmware 68, and the inquiring of the MFP 54 are repeatedly executed until the firmware is updated to the latest version. According to this configuration, the firmware 68 of the MFP 54 can be updated securely. When the firmware is updated to the latest version, and the control application 30 receives the execution propriety information indicating that the label print process is possible to be executed from the MFP 54, the label print button 88 not added with the mark 110 is displayed on the top screen 70. According to this configuration, the label print process is executed in the MFP 54 by operating the label print button 88 not added with the mark 110.

When the label print button 88 added with the mark 110 is displayed on the top screen 70, the control application 30 transmits the command for updating the firmware 68 to the MFP 54 due to the lapse of a predetermined time even though the label print button 88 is not operated. In other words, an elapsed time after displaying the label print button 88 added with the mark 110 is counted by a counter (not illustrated). The command for updating the firmware 68 is transmitted to the MFP 54 at timing when the elapsed time reaches set time. According to this configuration, the firmware 68 of the MFP 54 can be more securely updated. The transmitting of the command for updating the firmware 68 after the predetermined time elapses is also repeatedly executed until the firmware is updated to the latest version similarly to the operation of the label print button 88 added with the mark 110.

In this way, in the mobile phone 10, in a case where the MFP 54 is selected as a selection device, the label print button 88 is displayed in a state where the label print process is not possible to be executed according to the operation before the version upgrading of the firmware 68 of the MFP 54 is completed, that is, when the label print process is not executed in the MFP 54. The version upgrading of the firmware 68 is executed by operating the label print button 88 (that is, the label print button 88 added with the mark 110) in a state where the label print process is not possible to be executed according to an operation. Further, after upgrading the version of the firmware 68 of the MFP 54 is completed, that is, when the label print process is possible to be executed in the MFP 54, the label print button 88 is displayed in a state where the label print process is possible to be executed according to an operation.

In other words, in the mobile phone 10, the version of the firmware 68 of the selected MFP 54 is updated after the MFP 54 is selected. Therefore, the label print button 88 used to execute the label print process which is possible to be executed is displayed in a state where the label print process is possible to be executed according to an operation. According to this configuration, in a case where the MFP 54 is selected as a selection device but the version of the firmware 68 of the MFP 54 is not upgraded, the label print process is not possible to be executed, and the label print process is possible to be executed without reselecting the MFP 54.

Similarly to the label print button 88, the install button 82 is also displayed in a state where an install process of the plug-in 32 is not possible to be executed according to an operation before the version upgrading of the firmware 68 of the MFP 54 is completed. The version upgrading of the firmware 68 is executed by operating the install button 82 in a state where the install process is not possible to be executed according to an operation. Further, the install button 82 is displayed in a state where the install process of the plug-in 32 is possible to be executed according to an operation after the version upgrading of the firmware 68 of the MFP 54 is completed.

In other words, similarly to the label print button 88, a display mode of the install button 82 is changed according to the version upgrading of the firmware in a case where the selection device is a device which is possible to execute the label print process according to the upgrading of the version of the firmware. The install button 82 is not displayed on the information screen 80 as described above in a case where the plug-in 32 is installed in the mobile phone 10. Then, the display mode of the install button 82 is changed according to the upgrading of the version of the firmware before the plug-in 32 is installed.

Figure 3:
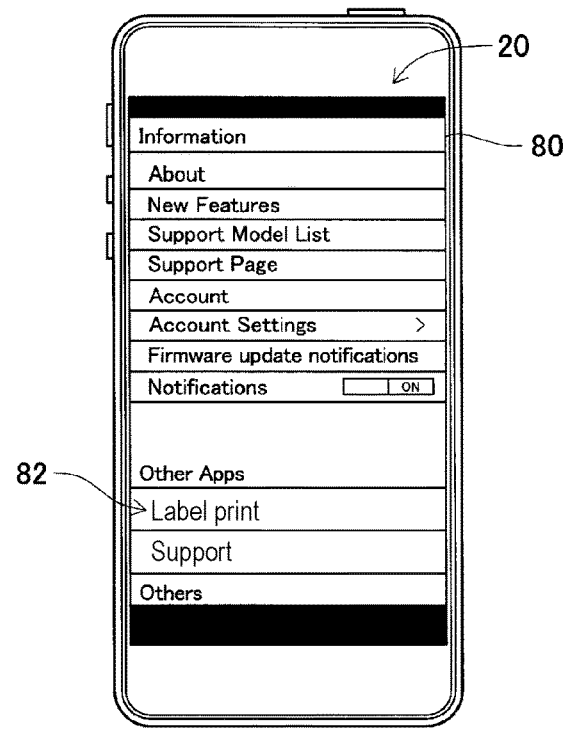
FIG. 3 is a diagram illustrating an information screen.

Specifically, first, before the plug-in 32 is installed, the control application 30 determines whether the selection device is selected. In a case where the selection device is not selected, the install button 82 is displayed on the information screen 80 as illustrated in FIG. 3. In other words, in a case where the selection device is not selected, the install button 82 is displayed in a state where the install process of the plug-in 32 is possible to be executed according to an operation. According to this configuration, the plug-in 32 is installed by the operation of the install button 82 before the selection device is selected.

In a case where the selection device is selected, the control application 30 determines whether the selection device is a device which is possible to execute the label print process. At this time, the corresponding model information is used. Specifically, for example, in a case where the selection device is the MFP 50, the model information of the MFP 50 belongs to the white list. Therefore, the MFP 50 is determined as a device which is possible to execute the label print process. At this time, as illustrated in FIG. 3, the install button 82 is displayed on the information screen 80. In other words, in a case where the selection device is a device which is possible to execute the label print process, the install button 82 is displayed in a state where the install process of the plug-in 32 is possible to be executed according to an operation. According to this configuration, in a case where a device which is possible to execute the label print process is selected as a selection device, the installation of the plug-in 32 is allowed.

For example, in a case where the selection device is the MFP 52, the model information of the MFP 52 belongs to the black list. Therefore, the MFP 50 is determined as a device which is not possible to execute the label print process. At this time, the install button 82 is displayed on the information screen 80 in a grayed-out state. According to this configuration, in a case where a device which is not possible to execute the label print process is selected as a selection device, the installation of the plug-in 32 is forbidden.

For example, in a case where the selection device is the MFP 54, the model information of the MFP 54 belongs to the gray list. Therefore, the MFP 54 is determined as a device which is possible to execute the label print process by updating the version of the firmware 68. Therefore, the control application 30 determines whether the label print process is possible to be executed by the MFP 54 if the version of the firmware 68 of the MFP 54 is updated. This determination process is the same as that described in the display mode of the label print button 88. Therefore, making an explanation simple, the control application 30 compares the latest version acquired from the server 56 with the current version acquired from the selection device.

In a case where the current version becomes the latest version, the version of the firmware 68 is upgraded to the latest version in the MFP 54. It is determined that the MFP 54 is possible to execute the label print process. Therefore, the control application 30 determines that the MFP 54 selected as a selection device becomes a device which is possible to execute the label print process by the version upgrading of the firmware 68. The control application 30 displays the install button 82 on the information screen 80. According to this configuration, in a case where the label print process is possible to be executed in the MFP 54, the installation of the plug-in 32 is allowed.

Figure 9:
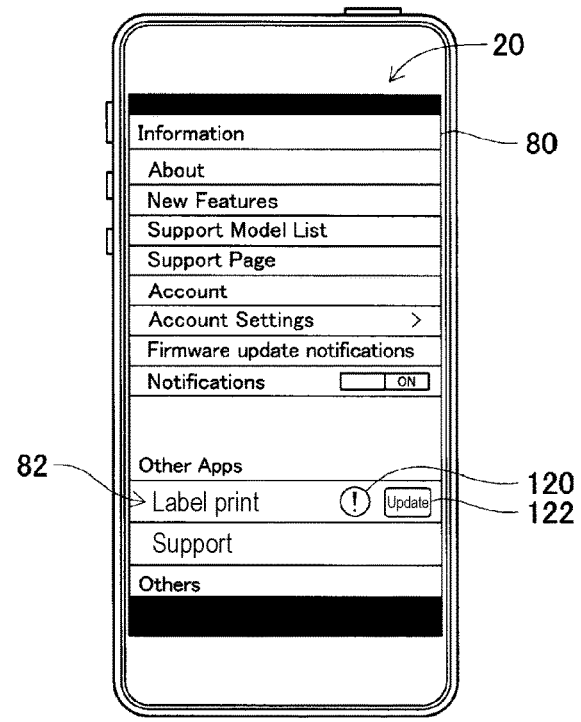
FIG. 9 is a diagram illustrating the information screen.

On the other hand, in a case where the current version is not the latest version when the control application 30 compares the latest version with the current version, the version of the firmware 68 in the MFP 54 is not upgraded to the latest version, and the MFP 54 is not possible to execute the label print process. Then, the control application 30 displays the install button 82 in a state where the install process of the plug-in 32 is not possible to be executed according to an operation. In other words, the control application 30 displays the install button 82 added with a mark (an example of a second specific symbol of this disclosure) 120 on the information screen 80 as illustrated in FIG. 9.

The mark 120 added to the install button 82 indicates that a process corresponding to the button is not executed even if the button to which the mark 120 is added is operated similarly to the mark 110 added to the label print button 88. Therefore, a process corresponding to the install button 82, that is, the plug-in 32 is not installed even if the user operates the install button 82 added with the mark 120.

An update button 122 is displayed next to the mark 120 added to the install butting 82. The update button 122 is a button to upgrade the version of the firmware of the selection device. Therefore, when the update button 122 is operated, the version upgrading of the firmware of the selection device is executed. Specifically, the control application 30 transmits the command for updating the version to the selection device, that is, the MFP 54. The MFP 54 stores information used to access the server 56, and accesses the server 56 using the information, so that the version upgrading of the firmware 68 is executed. According to this configuration, the version of the firmware 68 of the MFP 54 becomes the latest version.

Subsequently, the control application 30 inquires of the MFP 54 about whether the label print process is possible to be executed. In other words, the control application 30 transmits the transmission command of the execution propriety information with respect to the mobile phone 10 to the MFP 54. Then, the control application 30 receives the execution propriety information from the MFP 54. The control application 30 determines whether the MFP 54 is a device which is possible to execute the label print process by the upgrading of the version of the firmware 68 based on the execution propriety information received from the MFP 54.

Figure 10:
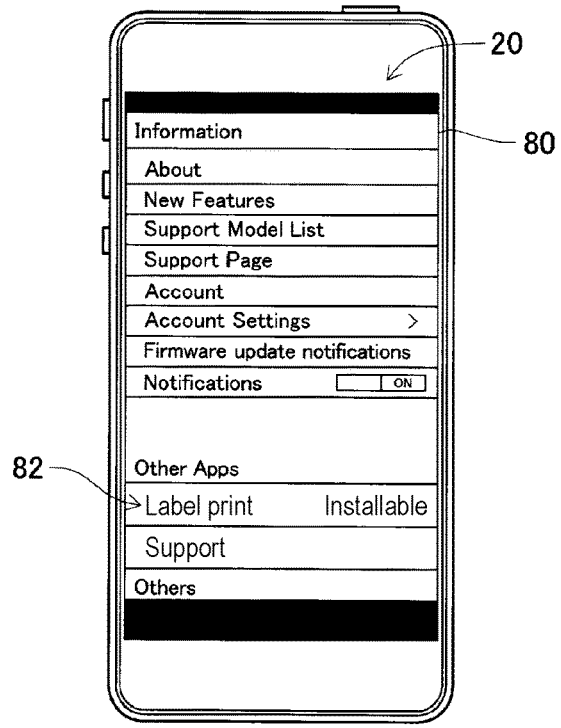
FIG. 10 is a diagram illustrating the information screen.
Figure 11:
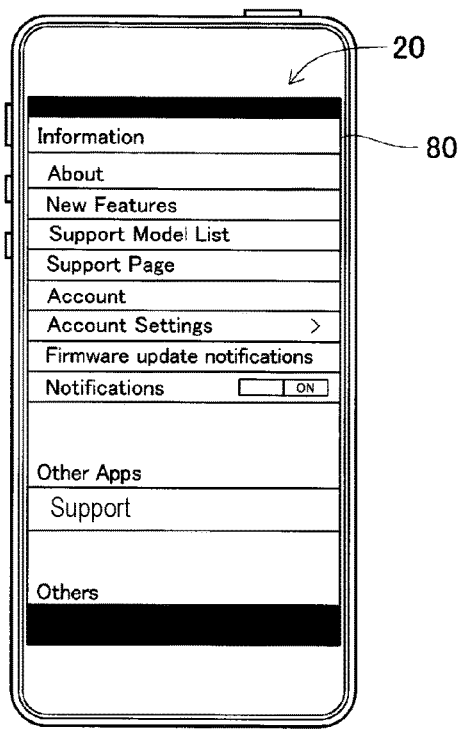
FIG. 11 is a diagram illustrating the information screen.

At this time, first, the MFP 54 transmits the execution propriety information indicating that the label print process is possible to be executed to the mobile phone 10 in order to update the firmware 68 of the MFP 54. The control application 30 determines that the MFP 54 is a device which is possible to execute the label print process by the upgrading of the version of the firmware 68. Therefore, the control application 30 does not display the mark 120 that has added to the install button 82 as illustrated in FIG. 10, and displays a comment of "Installable" next to the install button 82. The install button 82 becomes a state where the install process of the plug-in 32 is possible to be executed according to an operation by not displaying the mark 120. Therefore, the plug-in 32 is installed by a user's operation onto the install button 82. When the installation of the plug-in 32 is completed, the install button 82 is not displayed on the information screen 80 as illustrated in FIG. 11.

In this way, similarly to the label print button 88, a display mode of the install button 82 in the mobile phone 10 is changed according to the upgrading of the version of the firmware in a case where the selection device is a device which is possible to execute the label print process by the upgrading of the version of the firmware. In other words, in the mobile phone 10, the MFP 54 is selected, and then the version of the firmware 68 of the selected MFP 54 is updated. Therefore, the install button 82 of the plug-in 32 necessary for executing the label print process which is possible to be executed is displayed in a state of being installable according to an operation. According to this configuration, if the MFP 54 is selected as a selection device and the version of the firmware 68 of the MFP 54 is not upgraded, the plug-in 32 is possible to be installed without reselecting the MFP 54 even in a case where the label print process is not possible to be executed.

Process of Control Application

The displaying of label print button 88 is performed by executing the control application 30 in the CPU 12. In the following, the description will be given about a process when a flow of the control application 30 is executed in order to control the display mode of the label print button 88 using FIGS. 12 and 13.

Figure 12:
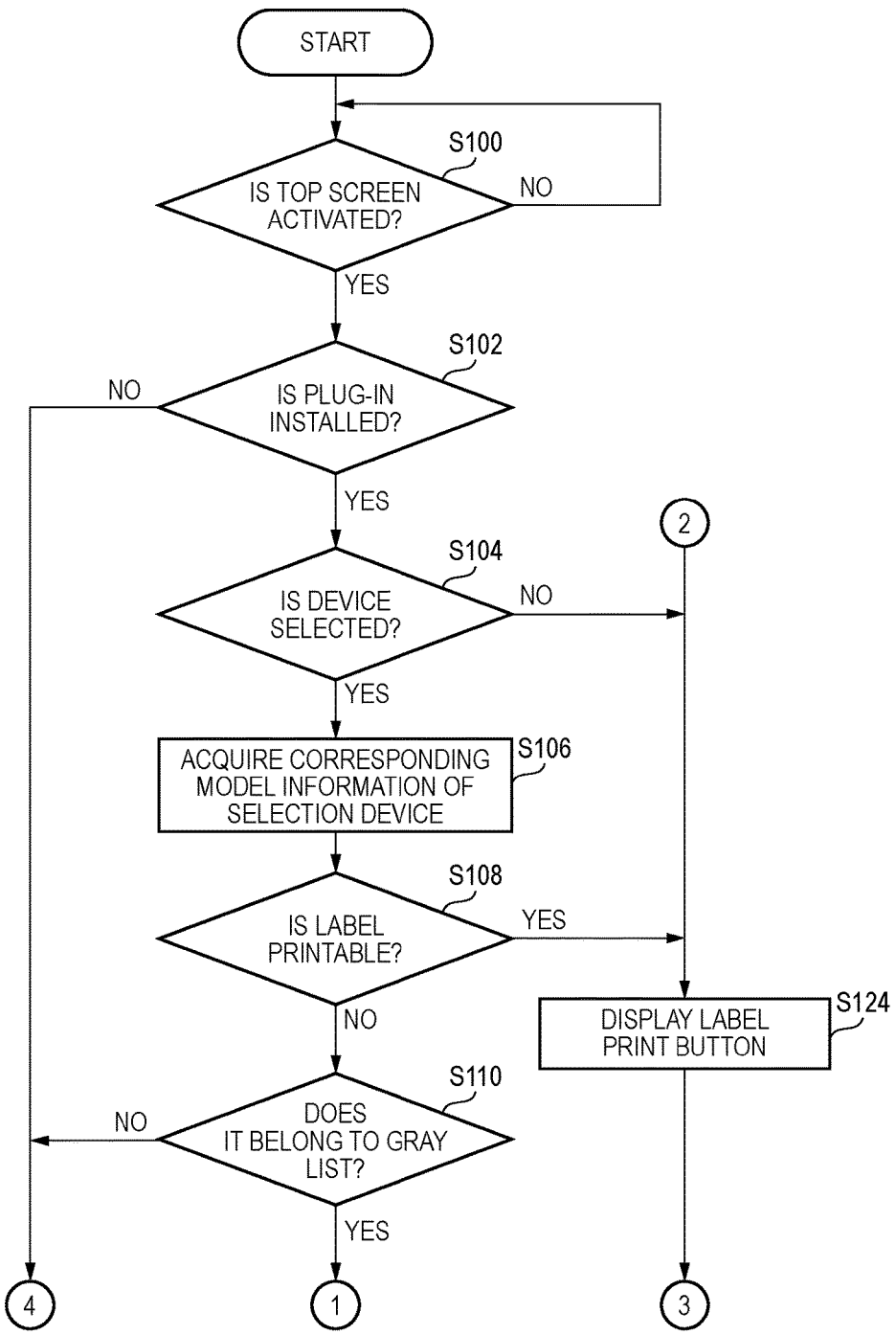
FIG. 12 is a flowchart illustrating a control application.
Figure 13:
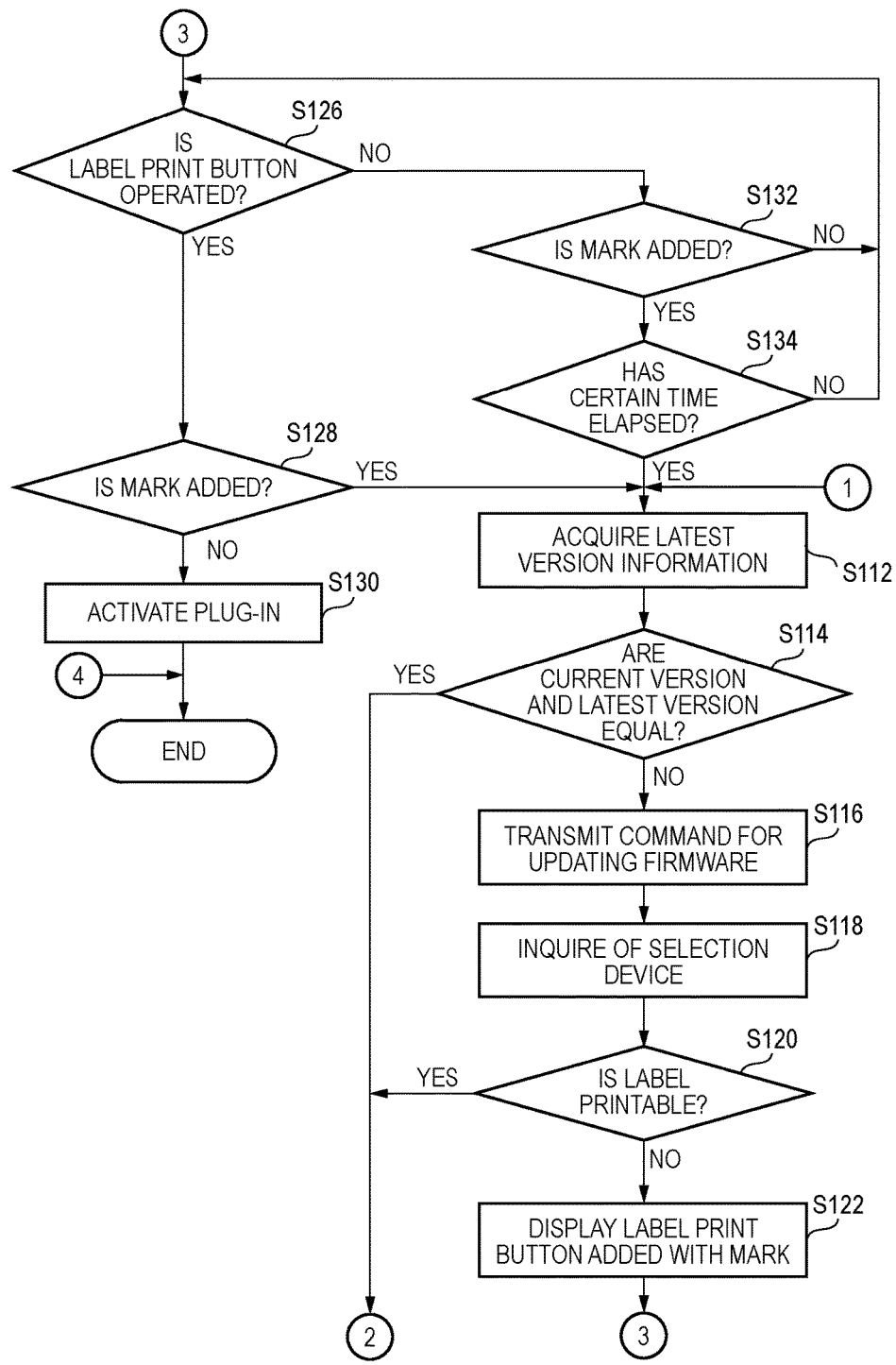
FIG. 13 is a flowchart illustrating the control application.

First, the CPU 12 determines whether the top screen 70 is activated (see FIG. 12: S100). In a case where the top screen 70 is not activated (S100: NO), the process of S100 is repeatedly performed. On the other hand, in a case where the top screen 70 is activated (S100: YES), the CPU 12 determines whether the plug-in 32 is installed in the mobile phone 10 (S102). In a case where the plug-in 32 is not installed (S102: NO), this flow is ended.

On the other hand, in a case where the plug-in 32 is installed (S102: YES), the CPU 12 determines whether the selection device is selected (S104). In a case where the selection device is selected (S104: YES), the CPU 12 acquires the corresponding model information of the selection device from the data storage region 34 (S106). Subsequently, the CPU 12 determines whether the selection device is possible to execute the label print process based on the corresponding model information (S108). In other words, it is determined which list among the black list, the white list, and the gray list includes the model information of the selection device.

In a case where it is determined that the selection device is not possible to execute the label print process (S108: NO), that is, in a case where the model information of the selection device is included in the black list or the gray list, the CPU 12 determines whether the model information of the selection device is included in the gray list (S110). At this time, in a case where it is determined that the model information of the selection device is included in the black list (S110: NO), this flow is ended.

On the other hand, in a case where it is determined that the model information of the selection device is included in the gray list (S110: YES), the CPU 12 accesses the server 56 to acquire the latest version information from the server 56 (see FIG. 13: S112). Next, the CPU 12 determines whether the current version and the latest version are equal (S114). In a case where the current version and the latest version are not equal (S114: NO), the CPU 12 transmits the command for updating the firmware, to the selection device (S116).

Subsequently, the CPU 12 inquires of the selection device about whether the label print process is possible to be executed (S118). In other words, the CPU 12 transmits the transmission command of the execution propriety information to the selection device. The CPU 12 determines whether the selection device is possible to execute the label print process based on the execution propriety information which is received in response (S120). At this time, in a case where the selection device is not possible to execute the label print process (S120: NO), the CPU 12 displays the label print button 88 added with the mark 110 on the top screen 70 (S122). The process proceeds to S126.

In a case where the selection device is possible to execute the label print process in S120 (S120: YES), in a case where the current version and the latest version are equal in S114 (S114: YES), in a case where it is determined in S108 that the selection device is possible to execute the label print process (S108: YES), and in a case where the selection device is not selected in S104 (S104: NO), the CPU 12 displays the label print button 88 not added with the mark 110 on the top screen 70 (S124). The process proceeds to S126.

In S126, the CPU 12 determines whether the label print button 88 is operated (S126). In a case where the label print button 88 is operated (S126: YES), the CPU 12 determines whether the mark 110 is added to the label print button 88 (S128). In a case where the mark 110 is not added (S128: NO), that is, a case where the label print button 88 not added with the mark 110 is operated, the plug-in 32 is activated (S130). This flow is ended. When the plug-in 32 is activated, the image data for label printing is created. The image data is transmitted to the selection device, so that the label print process is executed by the selection device.

On the other hand, in a case where the mark 110 is added (S128: YES), that is, a case where the label print button 88 added with the mark 110 is operated, the process proceeds to S112. In a case where the label print button 88 is not operated in S126 (S126: NO), the CPU 12 determines whether the mark 110 is added to the label print button 88 (S132). In a case where the mark 110 is not added (S132: NO), the process returns to S126. On the other hand, in a case where the mark 110 is added (S132: YES), the CPU 12 determines whether a certain period of time has elapsed after the mark 110 is displayed (S134). In a case where a certain period of time has not elapsed after the mark 110 is displayed (S134: NO), the process returns to S126. On the other hand, in a case where a certain period of time has elapsed after the mark 110 is displayed (S134: YES), the process of S112 and the subsequent processes are executed.

The displaying of the install button 82 is performed by executing the control application 30 in the CPU 12. Hereinafter, the description will be given about the process when a flow of the control application 30 is executed in order to control the display mode of the install button 82 using FIGS. 14 and 15.

Figure 14:
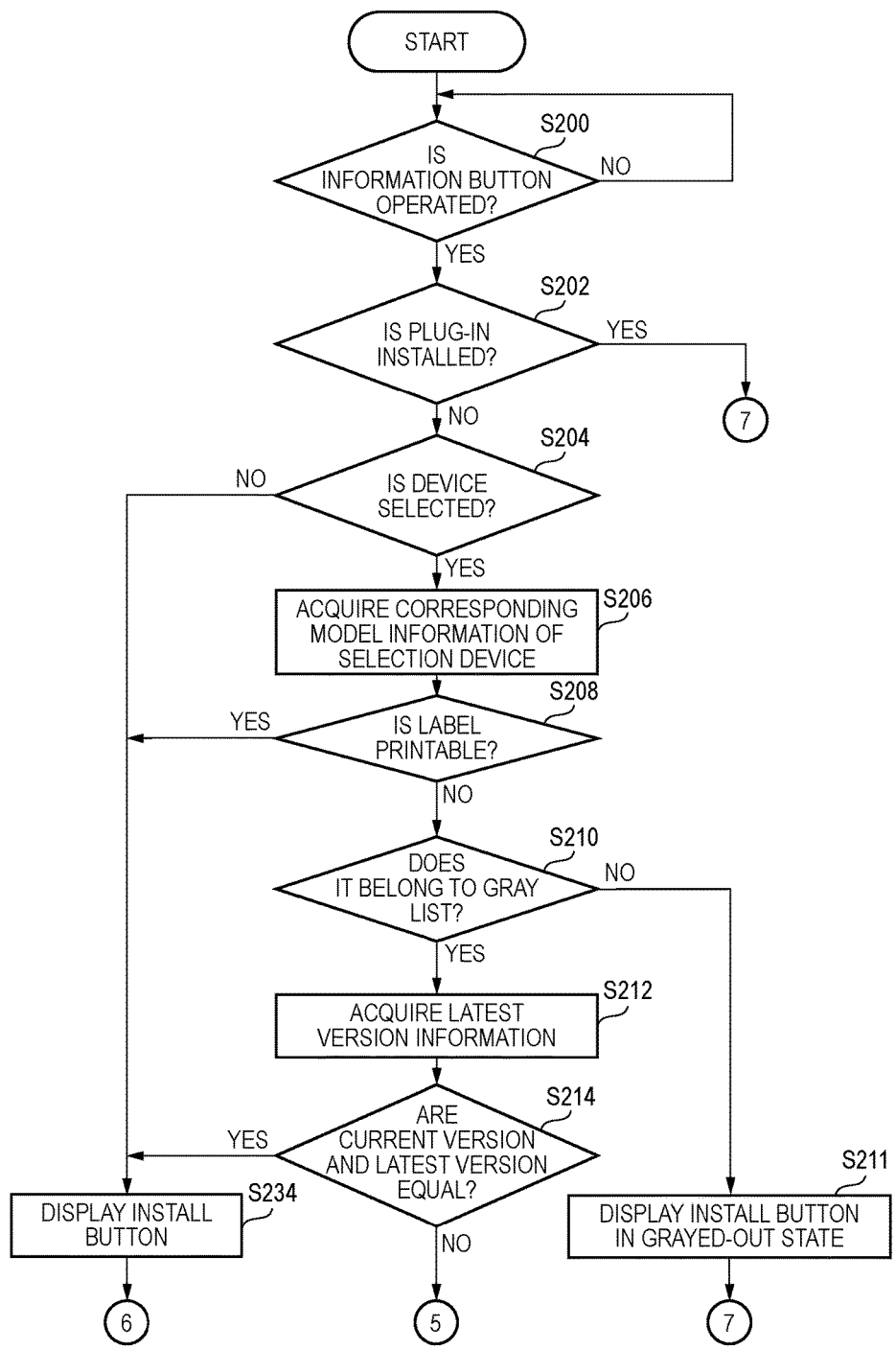
FIG. 14 is a flowchart illustrating the control application.
Figure 15:
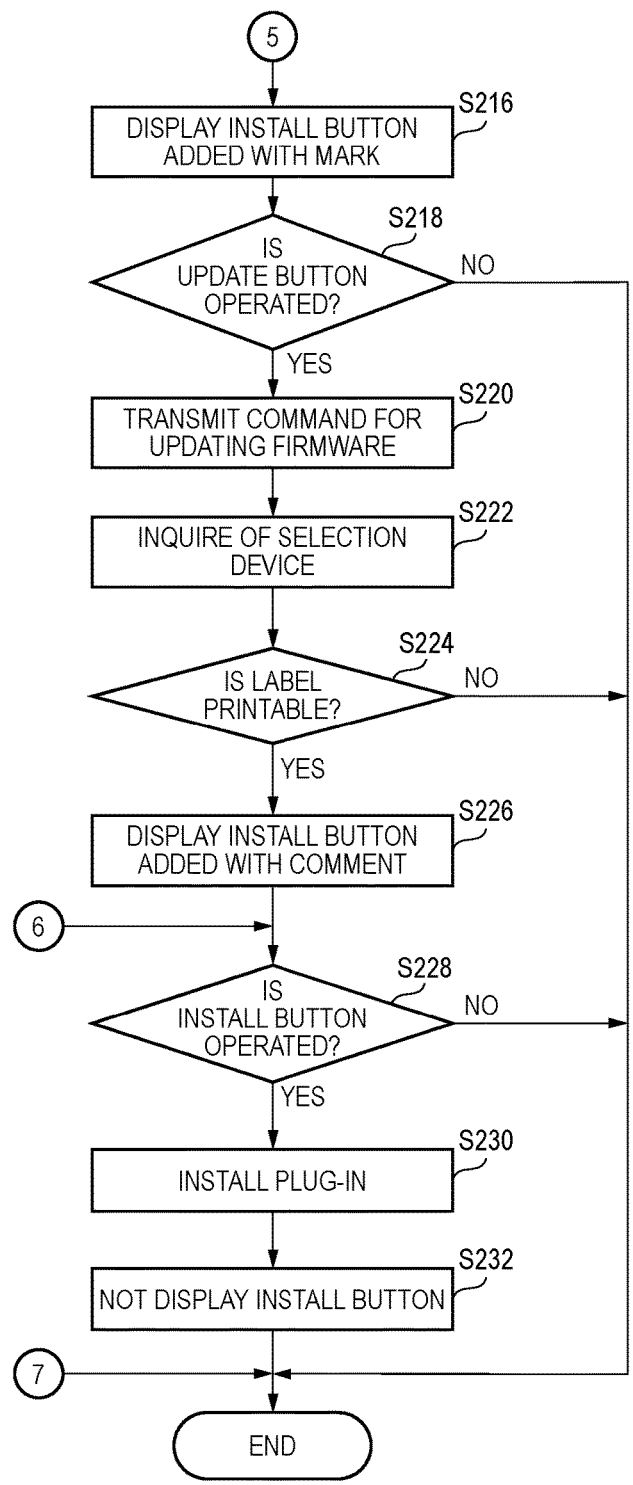
FIG. 15 is a flowchart illustrating the control application.

First, the CPU 12 determines whether the information button 78 of the top screen 70 is operated (see FIG. 14: S200). In a case where the information button 78 is not operated (S200: NO), the process of S200 is repeatedly performed. On the other hand, in a case where the information button 78 is operated (S200: YES), the CPU 12 determines whether the plug-in 32 is installed in the mobile phone 10 (S202). In a case where the plug-in 32 is installed (S202: YES), this flow is ended.

On the other hand, in a case where the plug-in 32 is not installed (S202: NO), the CPU 12 determines whether the selection device is selected (S204). In a case where the selection device is selected (S204: YES), the CPU 12 acquires the corresponding model information of the selection device from the data storage region 34 (S206). Subsequently, the CPU 12 determines whether the selection device is possible to execute the label print process based on the corresponding model information (S208). In other words, it is determined which list the model information of the selection device is included in among the black list, the white list, and the gray list.

In a case where it is determined that the selection device is not possible to execute the label print process (S208: NO), that is, a case where it is determined that the model information of the selection device is included in the black list or the gray list, the CPU 12 determines whether the model information of the selection device is included in the gray list (S210). At this time, in a case where it is determined that the model information of the selection device is included in the black list (S210: NO), the CPU 12 displays the install button 82 on the information screen 80 in a grayed-out state (S211). This flow is ended.

On the other hand, in a case where it is determined that the model information of the selection device is included in the gray list (S210: YES), the CPU 12 accesses the server 56 to acquire the latest version information from the server 56 (S212). Next, the CPU 12 determines whether the current version and the latest version are equal (S214). In a case where the current version and the latest version are not equal (S214: NO), the CPU 12 displays the install button 82 added with the mark 120 on the information screen 80 together with the update button 122 (see FIG. 15: S216).

Subsequently, the CPU 12 determines whether the update button 122 is operated (S218). In a case where the update button 122 is not operated (S218: NO), this flow is ended. On the other hand, in a case where the update button 122 is operated (S218: YES), the CPU 12 transmits the command for updating the firmware to the selection device (S220).

Subsequently, the CPU 12 inquires of the selection device about whether the label print process is possible to be executed (S222). In other words, the CPU 12 transmits the transmission command of the execution propriety information to the selection device. The CPU 12 determines whether the selection device is possible to execute the label print process based on the execution propriety information which is received in response (S224). At this time, in a case where the selection device is not possible to execute the label print process (S224: NO), this flow is ended.

On the other hand, in a case where the selection device is possible to execute the label print process (S224: YES), the CPU 12 displays the install button 82 with a comment of "Installable" on the information screen 80 (S226). Subsequently, the CPU 12 determines whether the install button 82 is operated (S228). In a case where the install button 82 is not operated (S228: NO), this flow is ended. On the other hand, in a case where the install button 82 is operated (S228: YES), the installation of the plug-in 32 is executed (S230). The install button 82 is not displayed (S232), and this flow is ended.

In a case where the current version and the latest version are equal in S214 (S214: YES), in a case where it is determined in S208 that the selection device is possible to execute the label print process (S208: YES), and in a case where the selection device is not selected in S204 (S204: NO), the CPU 12 displays the install button 82 on the information screen 80 (S234). The process of S228 and the subsequent processes are executed.

The process of S116 executed by the CPU 12 is an example of a first output process and a second output process. The process of S120 executed by the CPU 12 is an example of a first determination process. The process of S122 executed by the CPU 12 is an example of a first display process and a second display process. The process of S124 executed by the CPU 12 is an example of a notification process. The process of S208 executed by the CPU 12 is an example of a second determination process. The process of S216 executed by the CPU 12 is an example of a third display process. The process of S220 executed by the CPU 12 is an example of a third output process. The process of S226 executed by the CPU 12 is an example of the notification process.

This disclosure is not limited to the above embodiments. Various changes and improved modifications may be made by a person having ordinary skill in the art. Specifically, for example, in the above embodiments, the display modes of the install button 82 and the label print button 88 have been changed according to the upgrading of the version of the firmware of the selection device, but the display modes of other buttons may be changed. In other words, in a case where a predetermined process different from the installation function of the plug-in 32 and the execution function of the label printing becomes possible to be executed by the upgrading of the firmware of the selection device, the display mode of the operation button to execute the predetermined function may be changed according to the upgrading of the version of the firmware of the selection device.

In the above embodiments, it is possible to notify specific functions such as an execution function of the label print process and the installation function of the plug-in 32 by the displaying of the operation button, but the notification can be performed by various schemes such as an audio output and a data output. In other words, the label print process has been employed as a specific process which is possible to be executed by the upgrading of the version of the firmware of the selection device, but this disclosure is not limited to the label print process. Various image processes may be employed as a specific process.

In the above embodiments, the firmware of the selection device is automatically updated according to the command for updating the mobile phone 10, but the firmware may be updated by a user's operation. For example, in a case where the label print button 88 added with the mark 110 is operated, a screen showing that the label print process is possible to be executed by the updating of the firmware may be displayed on the LCD 20. The user checks the screen, and may update the firmware by a user's operation.

In the above embodiments, the description has been given about an example in which the processes illustrated in FIGS. 12 to 15 are executed by the CPU 12. These processes may be executed by an ASIC or other logical integrated circuits other than the CPU 12. Further, these processes may be executed in cooperation with the CPU, the ASIC, and the other logical integrated circuits.

What is claimed is:

1. A non-transitory computer-readable medium having instructions to control an information processing device, which includes a communication interface capable of communicating with an image processing device and a display interface, to perform operations, the operations comprising:
   causing to select an image processing device from one or more image processing devices,
   determining whether it is possible to execute functions which are capable of being executed by the instructions in the selected image processing device;
   displaying a specific function in a first display mode, in a case where the specific function is possible to be executed by updating a version of firmware of the selected image processing device; and
   displaying the specific function in a second display mode different from the first display mode, in a case where the specific function is not possible to be executed by updating a version of the firmware of the selected image processing device.

2. The non-transitory computer-readable medium having instructions according to claim 1, the instructions further causing the information processing device to perform an operation comprising:
   displaying an icon to execute the specific function on the display interface in a case where the specific function is possible to be executed according to an operation.

3. The non-transitory computer-readable medium having instructions according to claim 2,
   wherein the specific function is a command function to transmit an execute command of a specific process, which is possible to be executed by updating the version of the firmware of the selected image processing device, to the selected image processing device, and
   wherein a first operation button to execute the specific process is displayed as the icon.

4. The non-transitory computer-readable medium having instructions according to claim 3, the instructions further causing the information processing device to perform operations comprising:
   determining whether the selected image processing device is possible to execute the specific process,
   displaying the first operation button on the display interface in a state where the specific function is not possible to be executed according to an operation in a case where it is determined that the specific process is not possible to be executed, and
   outputting information to update the version of the firmware of the selected image processing device in a case where the first operation button displayed is operated.

5. The non-transitory computer-readable medium having instructions according to claim 3, the instructions further causing the information processing device to perform operations comprising:
   displaying a first specific symbol on the display interface in a case where the version of the firmware of the selected image processing device is not updated.

6. The non-transitory computer-readable medium having instructions according to claim 3, the instructions further causing the information processing device to perform operations comprising:
   outputting information to update the version of the firmware of the selected image processing device in a case where a predetermined period of time elapses after a first specific symbol is displayed on the display interface.

7. The non-transitory computer-readable medium having instructions according to claim 2,
   wherein the specific function is an install function of installing a program necessary for executing the specific process, and
   wherein a second operation button to install a program necessary for executing the specific process is displayed as the icon.

8. The non-transitory computer-readable medium having instructions according to claim 7, the instructions further causing the information processing device to perform operations comprising:
   determining whether the selected election image processing device is possible to execute the specific process, and
   wherein the second operation button is displayed in a case where it is determined that the specific process is possible to be executed.

9. The non-transitory computer-readable medium having instructions according to claim 8, the instructions further causing the information processing device to perform operations comprising:
   displaying, in a case where it is determined that the specific process is not possible to be executed, the second operation button in a state where the specific function is not possible to be executed according to an operation, on the display interface together with a second specific symbol, and
   outputting, in a case where the second operation button is displayed, information to update the version of the firmware of the selected image processing device and an install command of the program.

10. A non-transitory computer-readable medium having instructions to control an information processing device, which includes a communication interface capable of communicating with an image processing device, and a display interface, to perform operations, the operations comprising:
    causing to select an arbitrary image processing device from one or more image processing devices, and
    notifying a specific function, the specific function being possible to be executed by updating a version of firmware of a selection image processing device is selected in the selecting,
    wherein in the notifying, so as to notify the specific function, an icon to execute the specific function is displayed on the display interface in a state where the specific function is possible to be executed according to an operation,
    wherein the specific function is a command function to transmit an execute command of a specific process, which is possible to be executed by updating the version of the firmware of the selection image processing device, to the selection image processing device, and
    wherein in the notifying, an operation button to execute the specific process is displayed as the icon,
    wherein the instructions further causing the information processing device to perform an operation comprising:

outputting information to update the version of the firmware of the selection image processing device in a case where a predetermined period of time elapses after a specific symbol is displayed on the display interface.

11. A non-transitory computer-readable medium having instructions to control an information processing device, which includes a communication interface capable of communicating with an image processing device, and a display interface, to perform operations, the operations comprising:

causing to select an arbitrary image processing device from one or more image processing devices, and notifying a specific function, the specific function being possible to be executed by updating a version of firmware of a selection image processing device that is selected in the selecting, wherein in the notifying, so as to notify the specific function, an icon to execute the specific function is displayed on the display interface in a state where the specific function is possible to be executed according to an operation, wherein the specific function is an install function of installing a program necessary for executing the specific process, and wherein in the notifying, an operation button to install a program necessary for executing the specific process is displayed as the icon, wherein the instructions further causing the information processing device to perform operations comprising:

determining whether the selection image processing device is possible to execute the specific process, and wherein, in the notifying process, the operation button is displayed in a case where it is determined in the determining that the specific process is possible to be executed.

* * * * *

UNITED STATES PATENT AND TRADEMARK OFFICE
CERTIFICATE OF CORRECTION

PATENT NO. : 10,455,105 B2
APPLICATION NO. : 16/142301
DATED : October 22, 2019
INVENTOR(S) : Norihiko Asai It is certified that error appears in the above-identified patent and that said Letters Patent is hereby corrected as shown below:

In the Claims

Column 16, Claim 8, Line 22 should read:
determining whether the selected image

Column 16, Claim 10, Line 51 should read:
firmware of a selection image processing device that is Signed and Sealed this
Nineteenth Day of January, 2021

Andrei Iancu
*Director of the United States Patent and Trademark Office*